United States Patent
Abe et al.

(10) Patent No.: US 9,120,022 B2
(45) Date of Patent: Sep. 1, 2015

(54) GAME CONTROL SERVER APPARATUS

(71) Applicant: DeNA Co., Ltd., Tokyo (JP)

(72) Inventors: Yuuki Abe, Tokyo (JP); Minehiro Nagata, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 67 days.

(21) Appl. No.: 14/047,080

(22) Filed: Oct. 7, 2013

(65) Prior Publication Data

US 2015/0080132 A1 Mar. 19, 2015

(30) Foreign Application Priority Data

Sep. 13, 2013 (JP) ................................ 2013-190859

(51) Int. Cl.
*A63F 13/55* (2014.01)
*A63F 13/35* (2014.01)

(52) U.S. Cl.
CPC ................ *A63F 13/55* (2014.09); *A63F 13/35* (2014.09)

(58) Field of Classification Search
CPC .................... A63F 2300/55; A63F 2300/5533; A63F 2300/554; A63F 2300/5553; A63F 2300/65; A63F 13/00; A63F 13/12; A63F 13/35
USPC ................................................. 463/1, 42–43
See application file for complete search history.

(56) References Cited

U.S. PATENT DOCUMENTS

| | | | | |
|---|---|---|---|---|
| 7,749,056 B2 * | 7/2010 | Ando et al. | ............... | 463/6 |
| 2002/0029252 A1 * | 3/2002 | Segan et al. | ............... | 709/217 |
| 2002/0193157 A1 * | 12/2002 | Yamada et al. | ............... | 463/9 |
| 2003/0040364 A1 * | 2/2003 | Yabe et al. | ............... | 463/43 |
| 2003/0224856 A1 * | 12/2003 | Bukovsky et al. | ............... | 463/42 |
| 2007/0111795 A1 * | 5/2007 | Choi et al. | ............... | 463/42 |
| 2007/0202952 A1 * | 8/2007 | Francis et al. | ............... | 463/42 |
| 2008/0119268 A1 * | 5/2008 | Kando et al. | ............... | 463/31 |

FOREIGN PATENT DOCUMENTS

| | | |
|---|---|---|
| JP | 2003-334385 | 11/2003 |
| JP | 2010-136744 | 6/2010 |

OTHER PUBLICATIONS

Japanese Office Action mailed Nov. 12, 2013, JP 2013-190859.
Japanese Office Action mailed Nov. 12, 2013, Sequence No. D130053JP1, Patent Application No. 2013-190859.
"Attack on Hawk: Your World Conquest", Monthly Appli-style, East Press Co., Ltd., Dec. 28, 2012, vol. 1/No. 1, p. 180, with English concise explanation.

(Continued)

*Primary Examiner* — Jasson Yoo
(74) *Attorney, Agent, or Firm* — IPUSA, PLLC

(57) ABSTRACT

A game control server apparatus connected to terminal devices of a plurality of players via a network, includes a developing stage management unit that determines, in a developing stage in which a common character commonly owned by a plurality of players in a same team is developed, a capability parameter of the common character based on an action of each of the plurality of players; and a team battle stage management unit that provides, in a team battle stage in which one team battles against another team, a common character in a team battle while setting a capability parameter of the common character to the capability parameter of the common character determined by the developing stage management unit, upon accepting a calling instruction from a player in the one team.

8 Claims, 10 Drawing Sheets

(56) References Cited

OTHER PUBLICATIONS

"Absolute Defense Leviathan", Monthly Appli-style, East Press Co., Ltd., Feb. 28, 2013, vol. 1/No. 3, pp. 020-021, with English concise explanation.

"Ciel nosurge: Poem dedicated to the lost star", Dengeki Play Station, Ascii Media Works, May 17, 2012, vol.18/No. 18, pp. 92-95, with English concise explanation.

"Gantz/Xaos", Famitsu Gree, vol. 8, Enterbrain Co., Ltd. Nov. 22, 2012, p. 59, with English concise explanation.

* cited by examiner

FIG.5

| PLAYER ID | STATUS | ICON DATA | PLAYER NAME | TEAM ID | APPOINTED COMMON CHARACTER ID | OBTAINED POINT IN TEAM BATTLE | PARTICIPATING STATUS IN TEAM BATTLE |
|---|---|---|---|---|---|---|---|
| p001 | 16 | image_p001 | AAA | T001 | c001 | 20 | IN |
| p002 | 1 | image_p002 | BBB | T001 | c002 | 5 | IN |
| p003 | 53 | image_p003 | CCC | T001 | c001 | 0 | OUT |
| p004 | 24 | image_p004 | DDD | T001 | c005 | 0 | OUT |
| p005 | 31 | image_p005 | EEE | T001 | c004 | 2 | IN |
| p006 | 67 | image_p006 | FFF | T001 | c003 | 60 | IN |
| .. | .. | .. | .. | .. | .. | .. | .. |

TEAM ID:T001
64

| COMMON CHARACTER ID | ADDED POINT | ADDED PLAYER ID | TOTAL POINT | CAPABILITY PARAMETER |
|---|---|---|---|---|
| : | : | : | : | : |
| c001 | 20 | p001 | 120 | level_2 |
| c002 | 15 | p002 | 73 | level_1 |
| c001 | 100 | p003 | 220 | level_3 |
| c003 | 12 | p006 | 324 | level_4 |
| : | : | : | : | : |

FIG.7

| COMMON CHARACTER ID | COMMON CHARACTER NAME | POWER MANIFESTING SITUATION ||| TIME TO BE ACTIVATED (min.) | REQUIRED POINT FOR CALLING |
| --- | --- | --- | --- | --- | --- | --- |
| | | POWER | POWER MANIFESTING SCENE | SUPPORTING EFFECT | | |
| c001 | C1 | cause many opposing players to be in dead faints | when the number of opposing players who are in dead faints is small | 1.1 times power up /per click | 5 | 20 |
| c002 | C2 | attack base of opposing team | when the number of opposing players who are in dead faints is large | 1.1 times power up /per click | 5 | 20 |
| c003 | C3 | obtain large amount of points | when the number of players of the same team who log in is large | 1.1 times point up /per click | 0 | 10 |
| c004 | C4 | defense | when opposing team calls C1 or C2 | 1.1 times defense up /per click | 0 | 10 |
| c005 | C5 | recover | when the number of players of the same team who are dying is large | 1.1 times recovery up /per click | 0 | 10 |
| .. | .. | .. | .. | .. | .. | .. |

62

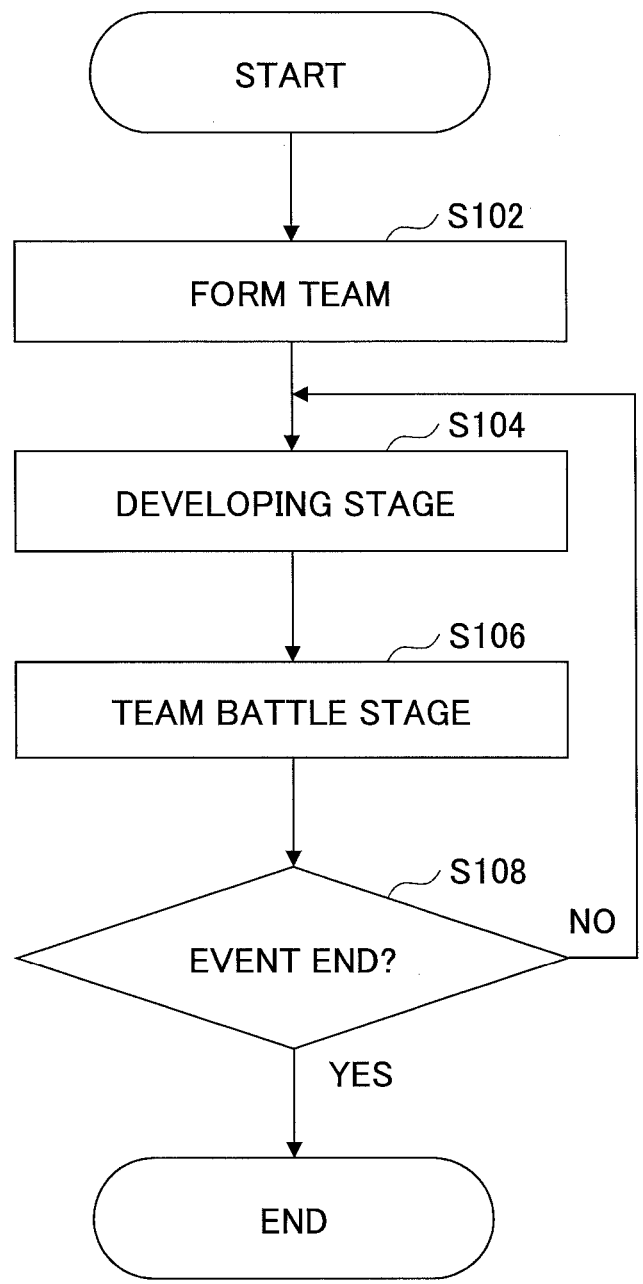

GAME CONTROL SERVER APPARATUS

CROSS-REFERENCE TO RELATED APPLICATION

The present application is based on and claims the benefit of priority of Japanese Priority Application No. 2013-190859 filed on Sep. 13, 2013, the entire contents of which are hereby incorporated by reference.

BACKGROUND OF THE INVENTION

1. Field of the Invention

The present invention relates to a game control server apparatus.

2. Description of the Related Art

Conventionally, a type of network games in which characters are developed is known. For example, Patent Document 1 (Japanese Laid-open Patent Publication No. 2003-334385) discloses a technique in which a first player and a second player develop a first character and a second character in game spaces, respectively, and developing parameters of the characters are updated when a communication event between the players occurs.

However, conventionally, only each of the players develops his/her own character.

Meanwhile, there is a mechanism in which player characters form teams to have a battle (hereinafter, referred to as a "team battle") between teams so that a union of players of the team is increased while the players can be fulfilled by wining the team battle.

However, players may be bored by just continuing the team battle. Thus, it is necessary to provide a mechanism capable of further increasing a union of players of a team while increasing a strategy in a game in a team battle.

PATENT DOCUMENT

[Patent Document 1] Japanese Laid-open Patent Publication No. 2003-334385

SUMMARY OF THE INVENTION

The present invention is made in light of the above problems, and provides a technique capable of further increasing a union of players of a team while increasing a strategy in a game in which a team battle is performed.

According to an embodiment, there is provided a game control server apparatus connected to terminal devices of a plurality of players via a network, including a developing stage management unit that determines, in a developing stage in which a common character commonly owned by a plurality of players in a same team is developed, a capability parameter of the common character based on an action of each of the plurality of players; and a team battle stage management unit that provides, in a team battle stage in which one team battles against another team, a common character in a team battle while setting a capability parameter of the common character to the capability parameter of the common character determined by the developing stage management unit, upon accepting a calling instruction from a player in the one team.

Note also that arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 5 is a view illustrating an example of an internal structure of a player information storing unit of the embodiment;

FIG. 6 is a view illustrating an example of an internal structure of a common character parameter storing unit of the embodiment;

FIG. 7 is a view illustrating an example of an internal structure of a common character set information storing unit of the embodiment;

FIG. 8 is a flowchart illustrating an example of a process of the game control server apparatus of the embodiment;

DETAILED DESCRIPTION OF THE PREFERRED EMBODIMENTS

Figure 1:
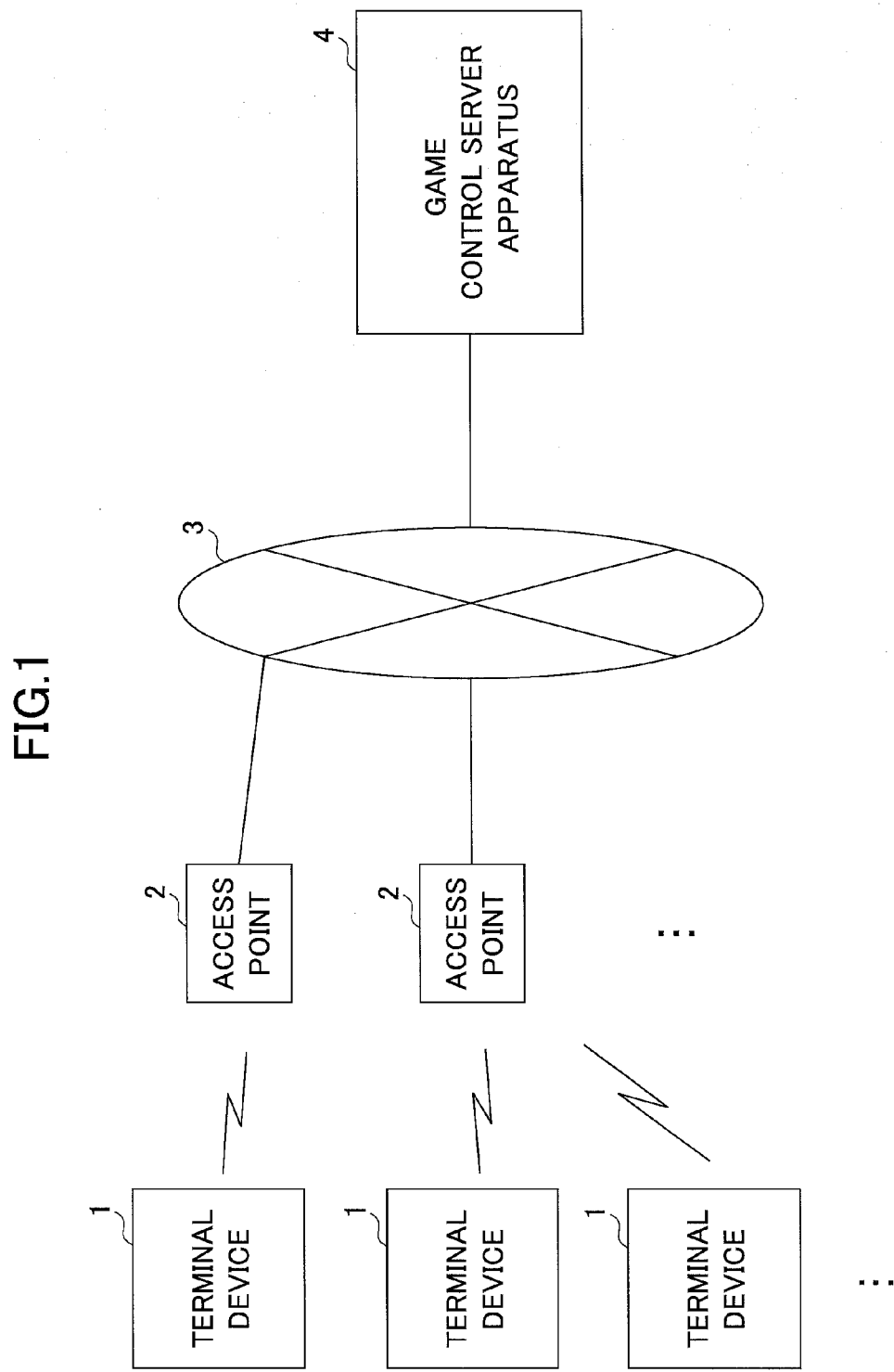
FIG. 1 is a block diagram illustrating an example of a system structure of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

FIG. 1 is a block diagram illustrating an example of a system structure of the embodiment.

The system includes terminal devices 1 possessed by players (users), access points 2 such as a mobile station, a Wi-Fi station or the like, a network 3 such as INTERNET or the like and a game control server apparatus 4 (a game processing server apparatus) that manages (controls) a game in which a plurality of players play the game via the network. The game control server apparatus 4 is connected to the terminal devices 1 of the plurality of players via the network 3. The terminal device 1 is, for example, a data processing apparatus such as a mobile phone, a smartphone, a console for a game, a personal computer, a touch pad, a digital book reader or the like.

Figure 2:
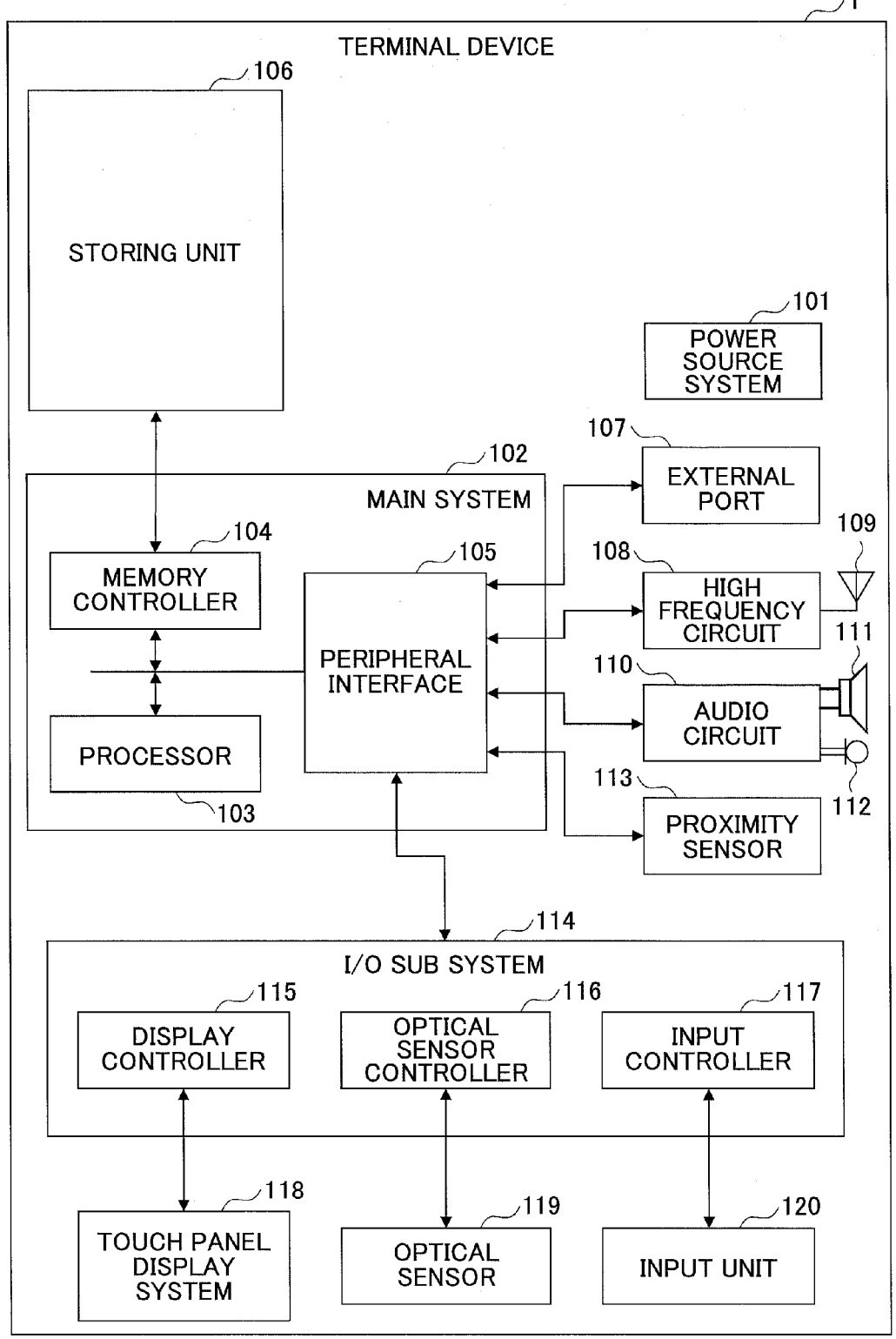
FIG. 2 is a block diagram illustrating an example of a hardware structure of a terminal device of the embodiment.

FIG. 2 is a block diagram illustrating an example of a hardware structure of the terminal device 1 of the embodiment.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, an I/O (Input/Output) sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116 and an input controller 117.

Figure 3:
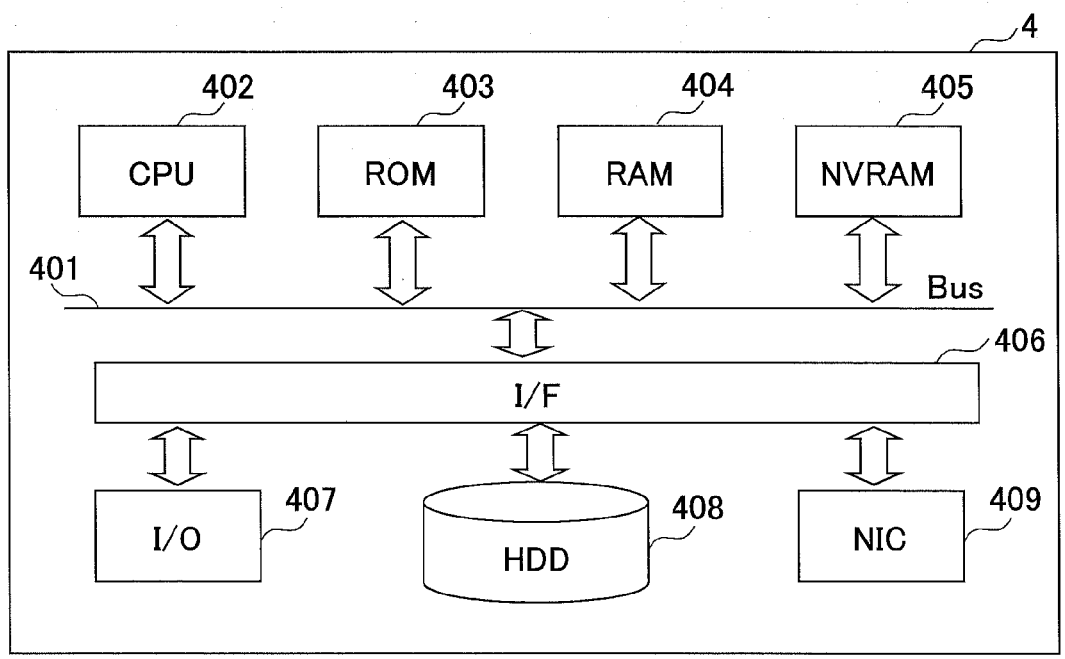
FIG. 3 is a block diagram illustrating an example of a hardware structure of a game control server apparatus of the embodiment.

FIG. 3 is a block diagram illustrating an example of a hardware structure of the game control server apparatus 4 of the embodiment.

The game control server apparatus 4 includes a CPU (Central Processing Unit) 402, a ROM (Read Only Memory) 403, a RAM (Random Access Memory) 404, an NVRAM (Non-Volatile Random Access Memory) 405 and an I/F (Interface) 406 connected to a system bus 401, an I/O (Input/Output device) 407 for a keyboard, a mouse, a monitor, a CD/DVD (Compact Disk/Digital Versatile Disk) drive or the like, an HDD (Hard Disk Drive) 408 and an NIC (Network Interface Card) 409 connected to the I/F 406, or the like.

Figure 4:
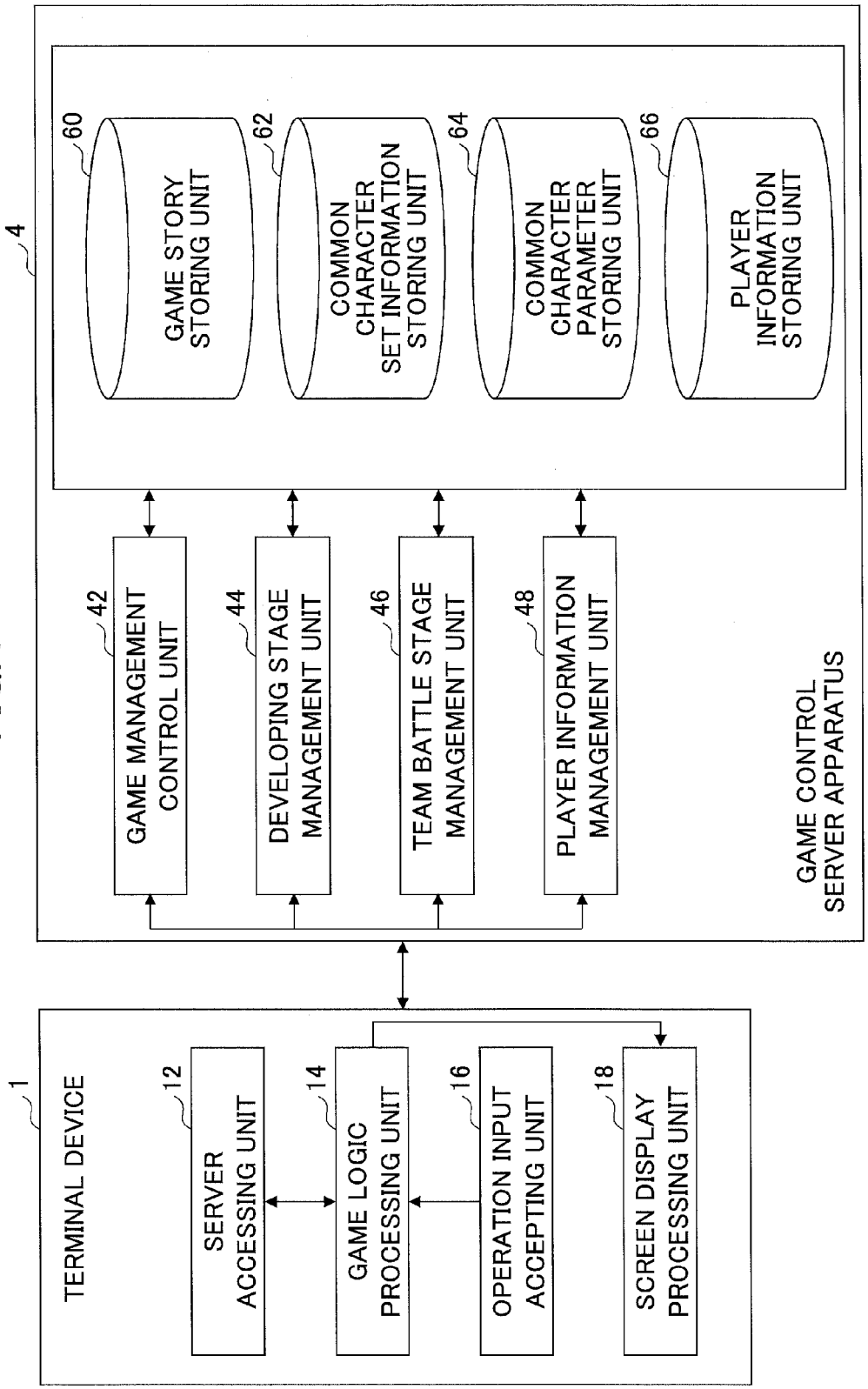
FIG. 4 is a block diagram illustrating an example of a functional structure of the terminal device and the game control server apparatus of the embodiment.

FIG. 4 is a block diagram illustrating an example of a functional structure of the terminal device 1 and the game control server apparatus 4 of the embodiment.

The terminal device 1 includes a server accessing unit 12, a game logic processing unit 14, an operation input accepting unit 16 and a screen display processing unit 18.

The operation input accepting unit 16 accepts an operation input of a player (user) that operates the terminal device 1.

The game logic processing unit 14 advances a game by displaying screens in accordance with the operation input accepted by the operation input accepting unit 16.

The server accessing unit 12 sends a request to the game control server apparatus 4 and receives a processed result or the like as a response from the game control server apparatus 4 when it is necessary to access the game control server apparatus 4 in a course of the processing by the game logic processing unit 14.

The screen display processing unit 18 displays screens under control of the game logic processing unit 14.

The game control server apparatus 4 includes a game management control unit 42, a developing stage management unit 44, a team battle stage management unit 46, a player information management unit 48, a game story storing unit 60, a common character set information storing unit 62, a common character parameter storing unit 64 and a player information storing unit 66.

The game story storing unit 60 stores a game story or the like for executing a game of the embodiment.

The game targeted in this embodiment may be one in which each player can obtain points by causing his/her player character to perform an action such as a quest, an attack, beating a boss or the like in a game space and the player character is developed so that a level of the player character increases in accordance with the obtained points at regular time. Further, the game may be configured as a developing stage in which a common character commonly owned by a plurality of players in a same team is developed, and a team battle stage in which one team has a team battle against another team are performed as an event of the game for a predetermined period such as a week or the like, for example. In this event, the plurality of players are respectively allocated to teams by a predetermined number.

In the team battle, player characters of the players form a team (airship group). Further, a common character (a called animal) is commonly owned by the players of each team. Here, each of the teams may commonly own a plurality of common characters whose power manifesting situations in the team battle are different.

A capability parameter such as a level, a capability or the like of the common character developed in each of the teams is determined based on an action such as a quest, an attack, beating a boss or the like, for example, performed by each of the plurality of players in the team in the developing stage. Then, in the team battle stage, the common character can be provided in the team battle upon a calling instruction of the common character by a player of the team. At this time, the common character is set to have the capability parameter determined in the developing stage.

With such a structure, as the capability parameter of the common character commonly owned by the team is increased by members of the team, attachments to the common character and a unity of the members of the team can be increased.

The game management control unit 42 controls the entirety of the game control server apparatus 4. The game management control unit 42, for example, refers to the game story storing unit 60 based on a request from the terminal device 1, performs a process in accordance with the game story, and sends a processed result of the request as a response to the terminal device 1.

The player information storing unit 66 stores various information of all of the players who participate in the game. The player information management unit 48 performs a management, such as updating, referring to or the like, of the player information stored in the player information storing unit 66.

FIG. 5 is a view illustrating an example of an internal structure of the player information storing unit 66 of the embodiment.

The player information storing unit 66 includes items (fields) such as "player ID", "status", "icon data", "player name", "team ID", "appointed common character ID", "obtained point in team battle", "participating status in team battle" or the like.

The "player ID" is data to specify a player. The "status" indicates a status of the player in a game progression. The "icon data" is data to specify a display icon of the player. The "player name" is data of a display name of the player. The "team ID" is data to specify a team to which the player is allocated. The "appointed common character ID" is data to specify a common character appointed by the player to develop in the developing stage. The "obtained point in team battle" indicates points obtained by the player in the team battle in the team battle stage. The "participating status in team battle" indicates a participating status (a log-in status) of the player in the team battle.

Referring back to FIG. 4, the developing stage management unit 44 determines a capability parameter of a common character based on an action of each of the plurality of players in the developing stage. Specifically, the developing stage management unit 44 adds points based on the action of each of the plurality of players and determines the capability parameter of the common character based on the total of the points added by the plurality of players. Here, the "action" of the player may be an action such as a quest, an attack, beating a boss or the like performed by the player character in the game space by each of the players.

In this embodiment, the developing stage management unit 44 accepts an appointment of common character to develop from each of the players, adds points to the appointed common character based on the action of the player under a state that the common character is appointed, and determines the capability parameter of the common character based on the total of the points added to the common character by the plurality of players.

Specifically, similar to the regular time, each of the players causes his/her player character to perform an action such as a quest, an attack, beating a boss or the like in the game space in the developing stage. When each of the players causes his/her player character to perform the action, the player appoints any one of the common characters to cause the common character to accompany with the player character. This means that the player character and the common character may be displayed in the game space. For the common character appointed by the player, points are added in accordance with the action of the player. For example, 1 point for a quest, 3 points for a normal attack, 10 points for a full attack, 30 points for beating a boss or the like may be added.

In this embodiment, it is assumed that the player can change the common character to appoint at any time. Further, it is assumed that the plurality of players in the same team can appoint the same common character at the same time. However, these can be arbitrarily changed based on a specification of a game design.

FIG. 6 is a view illustrating an example of an internal structure of the common character parameter storing unit 64 of the embodiment.

The common character parameter storing unit 64 includes items (fields) such as "common character ID", "added point", "added player ID", "total point", "capability parameter" or the like.

The "common character ID" is data to specify a common character. The "added point" indicates points added to the common character in accordance with the action of a player. The "added player ID" indicates player ID of a player who performed the action. The "total point" indicates a total of the points added to the common character. The "capability parameter" indicates a capability parameter of the common character that is determined based on the total point.

For example, it is assumed that when a player with player ID "p001" performs an action while appointing a common character with character ID "c001" in the developing stage, 20 points are added to the common character so that the total points and the capability parameter of the common character become 120 points and level_2, respectively. Thereafter, when a player with player ID "p003" performs an action while appointing the common character with the character ID "c001" in the developing stage and 100 points are added to the common character, the total point of the common character becomes 220 points. With this, the capability parameter of the common character with the character ID "c001" becomes level_3, for example. As such, according to the embodiment, a capability parameter of a common character can be increased by actions of a plurality of players who belong to the same team.

Referring back to FIG. 4, the developing stage management unit 44 may present (display) common characters appointed by other players, a current capability parameter of each of the common characters or the like, to each of the players. With this, each of the players can strategically appoint a common character to develop in accordance with developing statuses of other players or the capability parameter of each of the common characters. Further, the developing stage management unit 44 may be configured to present (display) a recommended common character such as a common character that is not appointed by the players many times and its capability parameter is still low or the like, to the players of the team, based on the current capability parameter of each of the common characters of each of the teams.

Upon accepting a calling instruction of a common character of the team from one of the players of the team in the team battle stage, the team battle stage management unit 46 provides the common character in the team battle while setting a capability parameter of the common character as the capability parameter of the common character determined by the developing stage management unit 44.

Further, in this embodiment, the team battle stage management unit 46 manages obtained points of each of the players in the team battle, and is configured to be capable of accepting the calling instruction only from the player whose obtained point becomes more than or equal to the required point set for the common character.

Further, as described above, in this embodiment, each of the teams may commonly own a plurality of common characters whose power manifesting situations in the team battle are different. The team battle stage management unit 46 presents (displays) a candidate of an effective common character to be provided in the team battle in accordance with a battle situation in a team battle between one team and another team, based on the power manifesting situation set for each of the common characters.

Further, upon accepting a supporting click from the player of the team while the common character is being called and provided in the team battle, the team battle stage management unit 46 increases the capability (power) of the common character in accordance with the number of times of supporting click.

In this embodiment, the number of times of supporting click may be limited such as each of the players who log in the game and participate in the team battle can make the supporting click for a predetermined time (once or the like, for example) every time the common character is called. With this configuration, as the capability of the common character can be increased more when more players log in the game and participate in the team battle, many of the players may be encouraged to participate in the team battle. However, these can be arbitrarily changed in accordance with a specification of a game design. As an alternative example, the game may be configured such that each of the players can make the supporting click for any times by paying his/her obtained points, for example, without limiting the number of times of supporting click.

As described above, in this embodiment, it is assumed that the developing stage and the team battle stage (team battle) are held during a predetermined period as an event in the game. Further, it is assumed that the team battle is held at a predetermined time period in each day within the predetermined period. Further, the team battle may be performed for plural times in each day.

Further, the time when the team battle is held may be notified to the players. With this, each of the players can perform actions to increase the capability parameter of the common character in the developing stage toward the team battle.

Further, the team battle stage management unit 46 notifies a fact that the team battle stage is going to be held to the players of one of the teams and another of the teams at a predetermined timing (10 minutes before, for example) before the team battle is held. The notification may be performed by sending a message such as chat or the like, for example, an electronic mail or the like to the terminal device 1. With this, many players can be encouraged to participate in the team battle.

FIG. 7 is a view illustrating an example of an internal structure of the common character set information storing unit 62 of the embodiment.

The common character set information storing unit 62 includes items (fields) such as "common character ID", "common character name", "power manifesting situation", "time to be activated (min.)", "required point for calling" or the like. The "common character ID" is data to specify a common character. The "common character name" is data of display name of the common character.

Further, although not illustrated in the drawings, the common character set information storing unit 62 may include an item "icon data" that is data to specify a display icon of the common character. As will be explained later, the common character may be configured such that its appearance changes in accordance with its capability parameter, and the common character set information storing unit 62 may be configured such that a plurality of display icons are corresponded with each of the common characters.

The "power manifesting situation" is data that indicates a power manifesting situation of the common character in the team battle. The "power manifesting situation" includes items (fields) such as "power", "power manifesting scene", "supporting effect" or the like. The "power" is data that indicates what kind of power is manifested by the common character. The "power manifesting scene" is data that indicates a scene in which the character can manifest or demonstrate the power, in other words, an appropriate timing for calling the common character. The "supporting effect" is data that indicates an effect when the player of the team makes a supporting click. Further, although not illustrated in the drawings, the common character set information storing unit 62 may include an item such as a skill or the like of each of the common characters.

The "time to be activated (min.)" is a period that is required for the common character to be activated after being called. "Activated" means that the common character manifests its power. When the players of the team make supporting clicks during a period from the calling of the common character to the activation of the common character, the capability of the common character is increased in accordance with the number of times of the supporting click.

The "required point for calling" is data that indicates points necessary for each of the players to call the common character. Here, the points may be those obtained by each of the players in the team battle. With this configuration, the player who has obtained a certain number of points in the team battle, in other words, the player who has a good knowledge about the strategy in the team battle can have a right to call the common character so that the common character can be appropriately called.

For example, for the common character "C1" with the common character ID "c001", the power is "cause many opposing players to be in dead faints", the power manifesting scene is "when the number of opposing players who are in dead faints is small" the supporting effect is "1.1 times power up/per click", it take 5 minutes to be actually activated after being called, and the points necessary to call is "20".

For example, it is assumed that a battle situation is that the number of characters of the players of the opposing team who are in dead faints is small. At this time, the team battle stage management unit 46 may refer to the common character set information storing unit 62 and select a common character "C1" whose power manifesting scene is "when the number of opposing players who are in dead faints is small", as a candidate of an effective common character to be provided in the team battle. Then, the team battle stage management unit 46 may display a message such as "calling timing for C1!!" or the like to the players of the team.

Further, although not illustrated in the drawings, the number of times for calling each of the common characters in each team game may be limited, and the common character set information storing unit 62 may store the limited number of times. However, these can be arbitrarily changed based on a specification of a game design. As an alternative example, the game may be configured such that each of the players can call the same common character for any times by paying his/her obtained points, for example, without limiting the number of times for calling each of the common characters.

Further, although not illustrated in the drawings, the common character set information storing unit 62 may store the capability parameter of the common character and a range of the total points necessary for the common character to be the capability parameter in correspondence with each other. Further, the appearance of the common character may be changed in accordance with the capability parameter, and the common character set information storing unit 62 may store a plurality of icon data for each of the common characters and correspond each of the icon data and the capability parameter at which the respective icon data is to be displayed.

For example, the setting may be that a level, as the capability parameter, increases step by step every time the total points increases for 100, where the display icon is a child when the level is less than or equal to 5 but becomes an adult when the level is more than or equal to 6, or the like. Further, when configured as such, a fact that the common character has grown up may be notified to all of the players of the team at a timing when the display icon is changed. With this, players can have attachments to the common character. Further, a unity of the team can be increased. Here, the setting such as how many points are necessary to increase the level for one step, or at what level the display icon is to change may be set for each of the common characters, or may be commonly set for all of the common characters.

Here, the "obtained point in team battle" illustrated in FIG. 5 may be reset for each team battle, reset each day, or not be reset during the predetermined period in which the event is held.

Further, in an alternative example, the points of the "required point for calling" may be points obtained in the developing stage by each of the players, by developing a specific character or a total points obtained by developing any of the characters.

FIG. 8 is a flowchart illustrating an example of a process of the game control server apparatus 4 of the embodiment.

First, when an event is held, a plurality of players are allocated to teams, respectively, by a predetermined number, based on the player information stored in the player information storing unit 66 (step S102). Subsequently, the developing stage is performed by the developing stage management unit 44 (step S104). Thereafter, the team battle stage is performed by the team battle stage management unit 46 (step S106). The operations of step S104 and step S105 are repeated until the event is finished (YES in step S108).

The teams may be formed in accordance with the following steps, for example. In each team, a predetermined number of players are allocated. Each of the teams is formed such that a player who performs the game actively to a certain degree, such as a player who continuously logs in the game for a predetermined period, a player who logs in the game at least once within a predetermined period, or the like, for example, is included.

Further, the teams may be formed such that the strength difference between one of the teams and the other of the teams having the team battle does not become large in accordance with a level of each of the players such as a status or the like of each of the players in the game at the regular time. With this, difference between teams can be reduced and all of the players can enjoy the game. Further, one of the teams and the other of the teams having the team battle may be the same during the predetermined period in which the event is held, may be a different combination in each day, or may be a different combination in each team battle.

Hereinafter, although not specifically described, the developing stage management unit 44 and the team battle stage management unit 46 send and receive data between the terminal device 1 via the game management control unit 42 and update and refer to the player information storing unit 66 via the player information management unit 48.

Figure 9:
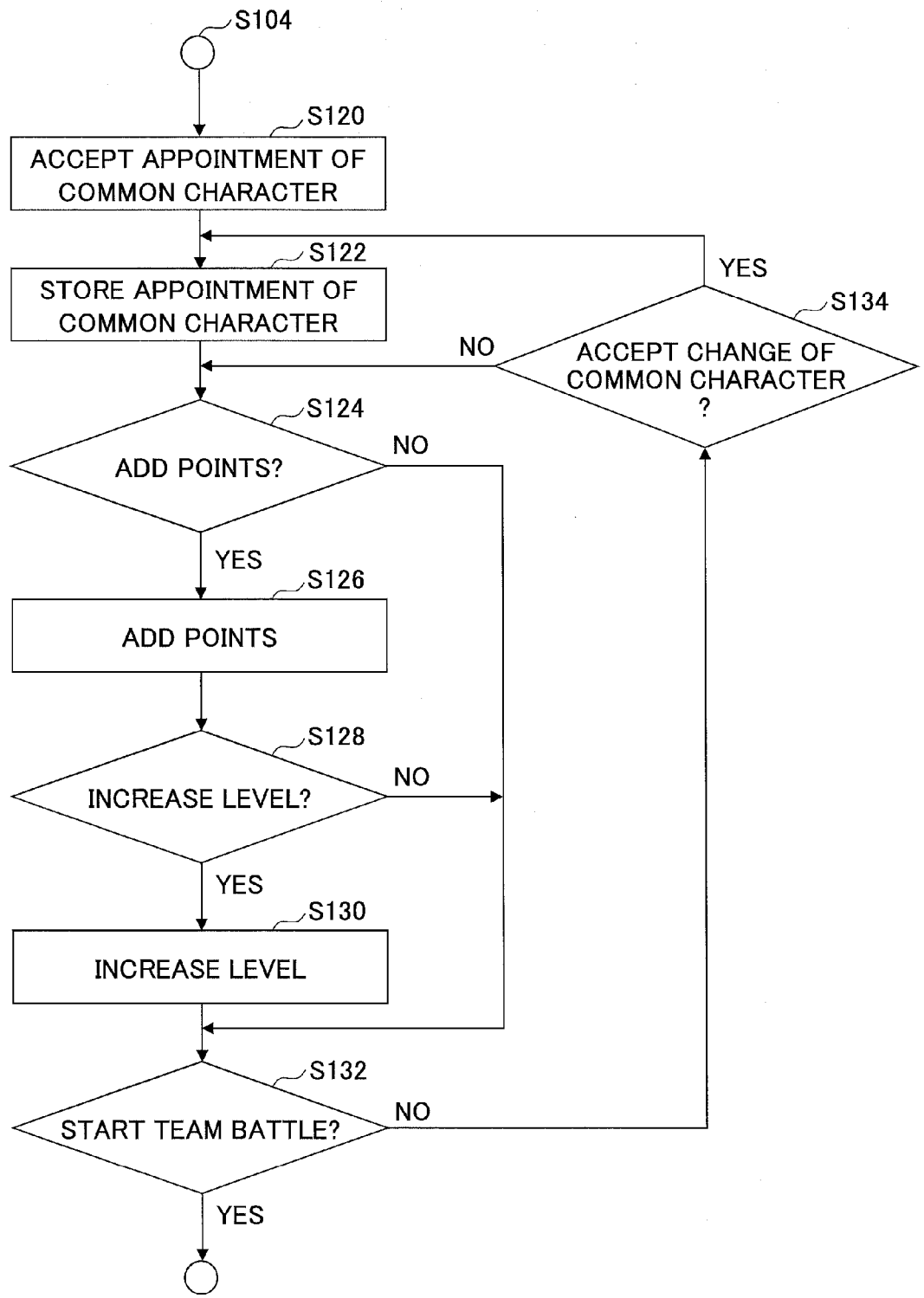
FIG. 9 is a flowchart illustrating an example of a process of the game control server apparatus of the embodiment in a developing stage.

Next, a process of the developing stage management unit 44 is explained. FIG. 9 is a flowchart illustrating an example of a process of the developing stage management unit 44 of the game control server apparatus 4 of the embodiment in the developing stage.

When either of the players logs in the game, and appoints a common character to develop from the respective terminal device 1, the developing stage management unit 44 accepts the appointment of the common character (step S120). The developing stage management unit 44 stores the common character ID of the common character for which the appointment is accepted as the appointed common character ID in the player information storing unit 66 (see FIG. 5) (step S122).

Thereafter, the developing stage management unit 44 monitors an action performed by the player in the developing stage, and determines whether to add points to the common character appointed by the player in accordance with the action (step S124). When it is determined to add points (YES in step S124), the developing stage management unit 44 adds the points (step S126). Specifically, the developing stage management unit 44 stores the common character ID, the added point and the added player ID in the common character parameter storing unit 64 (see FIG. 6).

Further, the developing stage management unit 44 calculates the total of the points to update the total points in the common character parameter storing unit 64 (see FIG. 6) and determines whether to increase the level of the common character based on the total points by referring to the common character set information storing unit 62 (step S128). The developing stage management unit 44 may determine whether to update the capability parameter of the common character based on the total points of the common character by referring to the common character set information storing unit 62.

When it is determined to increase the level of the common character (YES in step S128), the developing stage management unit 44 increases the level (performs a level-up process) (step S130). Specifically, the developing stage management unit 44 updates the capability parameter of the common character parameter storing unit 64 (see FIG. 6). Further, in accordance with necessity, the developing stage management unit 44 changes the appearance of the common character.

Thereafter, whether a team battle is started is determined (step S132), and when the team battle is started (YES in step S132), the developing stage is finished to proceed to step S106 in FIG. 8.

On the other hand, when the team battle is not started in step S132 (NO in step S132), the developing stage management unit 44 determines whether a change of a common character to develop by the player is accepted (step S134). When the change of the common character to develop is accepted (YES in step S134), the process proceeds to step S122, and the developing stage management unit 44 stores the common character ID of the common character for which the appointment is accepted as the appointed common character ID in the player information storing unit 66 (see FIG. 5) via the player information management unit 48. On the other hand, when there is no change in the common character to develop in step S134 (NO in step S134), the process proceeds to step S124 and the same operations are repeated.

Figure 10:
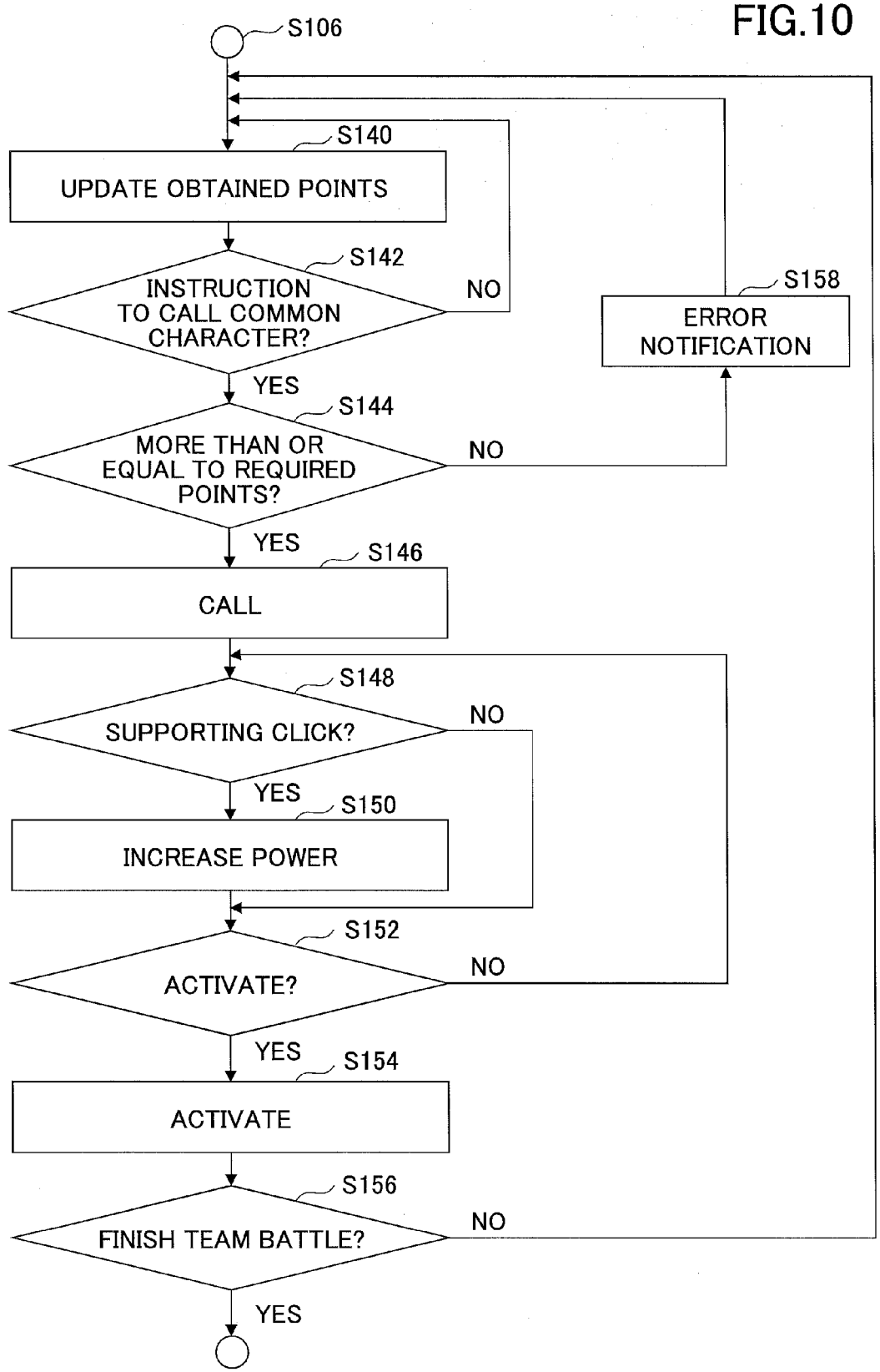
FIG. 10 is a flowchart illustrating an example of a process of the game control server apparatus of the embodiment in a team battle stage.

Next, a process of the team battle stage management unit 46 is explained. FIG. 10 is a flowchart illustrating an example of a process of the team battle stage management unit 46 of the game control server apparatus 4 of the embodiment in the team battle stage.

Here, although not illustrated in the drawings, in the team battle stage, the team battle stage management unit 46 may place player characters of players of one of the teams and other of the teams in a game space to be displayed on the display of the terminal device 1 of each of the players.

As an example, a team battle may be performed as follows in the team battle stage. Each of the players operates his/her player character. Each of the teams has a base such as a castle or the like. Predetermined hit points (HP) and battle points (BP) are provided to each of the player characters and the common characters.

The team battle is performed between 2 teams for a predetermined period (1 hour or the like, for example), for example, and the team whose obtained points are larger win the team battle. After finishing the team battle, prizes are given to both teams who won and lost the team battle. The player can obtain points when his/her player character or the common character of his/her team attacks the player character, the base or the common character of the opposing team.

Here, when the character attacks the character or the base of the opposing team, BP are consumed. For example, BP 1 point is consumed for a normal attack, BP 3 points are consumed for a full attack, BP 3 points are consumed when recovering a player character of own or a player character of another player in the same team from a dead faint or the like. The game may be configured that BP is consumed or BP is not consumed when calling a common character.

Further, when being attacked by the player character or the common character of the opposing team, HP decrease. When HP becomes zero, the character becomes a dead faint. Bonus points can be obtained when decreasing the HP of the player character of the opposing team to zero. The base can be attacked when at least one of the character players of the opposing team is in a dead faint. Points can be efficiently obtained by attacking the base compared with attacking the player character.

When a team battle is started, the team battle stage management unit 46 monitors obtained points of each of the players in the team battle, and updates the obtained points of the player who obtained the points as the "obtained point in team battle" in the player information storing unit 66 (see FIG. 5) via the player information management unit 48 (step S140). Further, although not illustrated in the drawings, when the team battle is started, the team battle stage management unit 46 recognizes the players participating in the team battle, and updates the "participating status in team battle" of the player information storing unit 66 (see FIG. 5) of each of the players. At this time, the team battle stage management unit 46 may highlight the displayed player characters of the players who participate in the team battle, or the like.

Thereafter, upon a calling instruction of a common character from either of the players (YES in step S142), the team battle stage management unit 46 refers to the player information storing unit 66 and the common character set information storing unit 62. Then, team battle stage management unit 46 determines whether the obtained points of the player is more than or equal to the required points for calling in the team battle stage based on the "obtained point in team battle" of the player and the "required point for calling" set for the common character for which the calling instruction is accepted (step S144). When the obtained points is more than or equal to the required point for calling (YES in step S144), the team battle stage management unit 46 performs a calling process to provide the common character for which the calling instruction is accepted in the team battle (step S146). At this time, the team battle stage management unit 46 refers to the common character parameter storing unit 64, sets the current capability parameter of the common character determined in the developing stage to the common character and provides the common character in the team battle. Here, the team battle stage management unit 46 controls such that the capability to beat an opponent of the common character becomes higher as the capability parameter is higher in accordance with the set capability parameter. On the other hand, when the obtained points of the player is not more than or equal to the required point for calling in step S144 (NO in step S144), the team battle stage management unit 46 notifies an error or the like to the terminal device 1 of the player (step S158), and returns to step S140.

After step S146, the team battle stage management unit 46 monitors whether a supporting click is made by other players in the team for which the common character is called (step S148). Upon accepting the supporting click (YES in step S148), the team battle stage management unit 46 increases the power of the common character in accordance with the setting of the supporting effect of the team battle stage management unit 46 (step S150). The operations of step S148 and step S150 are performed until a timing at which the common character is activated, and at an activation timing of the common character (YES in step S152), the common character is activated in accordance with the power at the timing (step S154). Thus, the common character is activated as having the power increased by the supporting click(s) in the team battle from the base power of the capability parameter determined in the developing stage.

Thereafter, whether the team battle is finished is determined (step S156), and when the team battle is not finished (NO in step S156), the process returns to step S140 and the same operations are repeated. On the other hand, when the team battle is finished, such as the held time of the team battle is finished or the like, for example (YES in step S156), the team battle stage is finished to proceed to step S108 in FIG. 8.

As described above, according to the game control server apparatus 4 of the embodiment, as the capability parameter of the common character that is commonly owned by the team is increased by the members of the team, attachments to the common character and a unity of the members of the team can be increased. Thus, a union of players of a team can be further increased while increasing a strategy in a game in which a battle between teams is performed.

Constituents of the terminal device 1 and the game control server apparatus 4 in FIG. 4 indicate not a structure of hardware units but blocks of functional units. The individual constituents of the terminal device 1 and the game control server apparatus 4 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications. Further, functions performed by the game control server apparatus 4 may be unnecessarily actualized in a single apparatus and may be distributed in a plurality of apparatuses.

According to the embodiment, a technique capable of further increasing a union of players of a team while increasing a strategy in a game in which a battle between teams is performed can be provided.

Although a preferred embodiment has been specifically illustrated and described, it is to be understood that minor modifications may be made therein without departing from the spirit and scope of the invention as defined by the claims.

For example, the game management control unit 42 of the game control server apparatus 4 may provide a function capable of sending messages between players in each of the teams such as a chat or the like in both the developing stage and the team battle stage. With this, the players in each of the teams can make a strategy by sending messages with each other so that it is possible to further increase a union of players of a team while increasing a strategy.

Further, as explained above with reference to FIG. 6, an example is described in which points are added to the common character appointed by the player in accordance with the actions of the player in the developing stage, in the above embodiment. However, in an alternative example, the developing stage management unit 44 may add points as total points to the entirety of the plurality of common characters based on the actions of each of the plurality of players in the developing stage. Then, the developing stage management unit 44 may give, upon accepting an instruction of adding predetermined points to either of the common characters from a player of the team, the predetermined points to the common character within a range of the total points added by the plurality of players, and determine the capability parameter of the common character based on the total points added to the common character. With this configuration, how many points are added to which of the common characters and what degree of the capability parameter is added can be determined within the range of the total point so that the strategy can be increased.

However, in this case as well, in the developing stage, the player can appoint any of the common characters so that it can be displayed in the game space as if the common character accompanies with the player character. With this, an attachment to the common character for each of the players can be increased.

Further, although a structure in which the developing stage and the team battle stage are performed when an event is held, in the above embodiment as an example, the developing stage and the team battle stage may be performed as a regular game.

Further, the game may be performed by any of a "browser type" and an "application type". In the browser type, screen transition data (View data) that describes a display control content of a series of screens in accordance with the game progression is managed at the game control server apparatus 4 side, data such as an HTML data document, images corresponded to the HTML data document or the like are sent to the terminal device in response to a request of obtaining data by an input operation from the terminal device 1, and the data are displayed in the web browser on the terminal device 1. Meanwhile, in the application type, game application software (application program) is previously downloaded to the terminal device 1 from the game control server apparatus 4 or the like, the game application software is executed on the terminal device 1, and screen data is generated to be displayed based on screen transition data included in the game application software that is stored in the terminal device 1 after being downloaded and data obtained from the server by an input operation as a trigger.

What is claimed is:
1. A game control server apparatus connected to terminal devices of a plurality of players via a network, comprising:
a processor; and a non-transitory computer-readable recording medium containing instructions that, when executed, cause the processor to control a video game by
  executing a team battle stage in which a plurality of teams battle against each other,
  allocating a plurality of players to each team, wherein each of the players is distinguished by a player ID,
  managing the teams, the plurality of players allocated to each team by the player ID, and plurality of common characters owned by each of the plurality of teams, wherein each of the plurality of common characters are commonly owned by a plurality of players in a same team,
  executing a developing stage in which each of the plurality of players can select a common character and develop the selected common character by performing an action with the selected common character, wherein each of the plurality of player's actions are tracked and a point is obtained based on each of the plurality of player's actions of the selected common character,
  accumulating the points for each team obtained by each of the plurality of players in the developing stage,
  accepting an instruction from a player of one of the plurality of teams to give a predetermined amount of points to one of the common characters,
  giving the predetermined amount of points to the one of the common characters from the accumulated points,
  determining a capability parameter of the one of the common characters based on the points given to the one of the common characters,
  accepting an instruction from a player of one of the plurality of teams to call one of the common characters into a team battle stage to battle against another team, wherein during the battle stage, the player that called the common character can perform an action with the called common character, and
  providing the called common character with the capability parameter determined based on the points given to the called common character, wherein each of the common characters have different powers from each other.

2. The game control server apparatus according to claim 1, wherein the instructions contained in the non-transitory computer-readable recording medium further cause the processor to control the video game by adding a point to each of the players based on an action of a character of each of the players in the team battle stage, and
wherein in the accepting the instruction from the player of the one of the plurality of teams to call the one of the common characters into the team battle stage, the instruction is accepted only when the points added for the one of the players in the developing stage becomes more than or equal to required points set for the one of the common characters.

3. The game control server apparatus according to claim 1, wherein the instructions contained in the non-transitory computer-readable recording medium further cause the processor to control the video game by increasing a capability of each of the common characters in accordance with a supporting click from one of the players of the team by which the respective common character is owned, while the common character is provided in the team battle.

4. The game control server apparatus according to claim 1, wherein the team battle stage is set to be held at a predetermined time, and
wherein the instructions contained in the non-transitory computer-readable recording medium further cause the processor to control the video game by notifying the players of each of the teams at a predetermined timing before opening the team battle stage.

5. A game control server apparatus connected to terminal devices of a plurality of players via a network, comprising:
  a processor; and
  a non-transitory computer-readable recording medium containing instructions that, when executed, cause the processor to control a video game by
    executing a team battle stage in which a plurality of teams battle against each other,
    allocating a plurality of players to each team, wherein each of the players is distinguished by a player ID,
    managing the teams, the plurality of players allocated to each team by the player ID, and plurality of common characters owned by each of the plurality of teams, wherein each of the plurality of common characters are commonly owned by a plurality of players in a same team,
    executing a developing stage in which each of the plurality of players can select a common character and develop the selected common character by performing an action with the selected common character, wherein each of the plurality of player's actions are tracked and a point is obtained based on each of the plurality of player's actions of the selected common character,
    determining a capability parameter of each of the common characters owned by each of the plurality of teams based on the point added to each of the players allocated to the respective team,
    presenting a candidate common character, to the players of each of the plurality of teams, to be provided in a battle of the respective team against another team based on an actual situation of the battle and the situations in which the common characters owned by the respective team demonstrate their power,
    accepting an instruction from a player of the respective team to call one of the common characters, and
    providing the called common character with the capability parameter determined based on the point added to each of the players allocated to the respective team, wherein each of the common characters have different powers from each other.

6. The game control server apparatus according to claim 5, wherein the instructions contained in the non-transitory computer-readable recording medium further cause the processor to control the video game by accepting an appointment from a player of one of the teams of one of the common characters owned by the one of the teams to develop,
wherein in the executing the developing stage, the point is added to and accumulated for the common character selected by the respective player, and
wherein in the determining the capability parameter of each of the common characters, the capability parameter of each of the common characters is determined based on the points accumulated for the respective common character.

7. A non-transitory computer-readable recording medium having recorded thereon a game control program containing instructions that, when executed, cause a processor of a computer to control a video game by
  executing a team battle stage in which a plurality of teams battle against each other, allocating a plurality of players to each team, wherein each of the players is distinguished by a player ID, managing the teams, the plurality of players allocated to each team by the player ID, and plurality of common characters owned by each of the plurality of teams, wherein each of the plurality of common characters are commonly owned by a plurality of players in a same team, executing a developing stage in which each of the plurality of players can select a common character and develop the selected common character by performing an action with the selected common character, wherein each of the plurality of player's actions are tracked and a point is obtained based on each of the plurality of player's actions of the selected common character, accumulating the points for each team obtained by each of the plurality of players in the developing stage, accepting an instruction from a player of one of the plurality of teams to give a predetermined amount of points to one of the common characters, giving the predetermined amount of points to the one of the common characters from the accumulated points, determining a capability parameter of the one of the common characters based on the points given to the one of the common characters, accepting an instruction from a player of one of the plurality of teams to call one of the common characters into a team battle stage to battle against another team, wherein during the battle stage, the player that called the common character can perform an action with the called common character, and providing the called common character with the capability parameter determined based on the points given to the called common character, wherein each of the common characters have different powers from each other.

8. A non-transitory computer-readable recording medium having recorded thereon a game control program containing instructions that, when executed, cause a processor of a computer to control a video game by executing a team battle stage in which a plurality of teams battle against each other, a plurality of players, allocating a plurality of players to each team, wherein each of the players is distinguished by a player ID, managing the teams, the plurality of players allocated to each team by the player ID, and plurality of common characters owned by each of the plurality of teams, wherein each of the plurality of common characters are commonly owned by a plurality of players in a same team, executing a developing stage in which each of the plurality of players can select a common character and develop the selected common character by performing an action with the selected common character, wherein each of the plurality of player's actions are tracked and a point is obtained based on each of the plurality of player's actions of the selected common character, determining a capability parameter of each of the common characters owned by each of the plurality of teams based on the point added to each of the players allocated to the respective team, presenting a candidate common character, to the players of each of the plurality of teams, to be provided in a battle of the respective team against another team based on an actual situation of the battle and the situations in which the common characters owned by the respective team demonstrate their power, accepting an instruction from a player of the respective team to call one of the common characters, and providing the called common character with the capability parameter determined based on the point added to each of the players allocated to the respective team, wherein each of the common characters have different powers from each other.

* * * * *